(12) United States Patent
Johnson et al.

(10) Patent No.: US 7,770,506 B2
(45) Date of Patent: Aug. 10, 2010

(54) ARMORED CAB FOR VEHICLES

(75) Inventors: Ricky Don Johnson, Katy, TX (US);
Regis Luther, Katy, TX (US); Michael K. Ross, Guy, TX (US)

(73) Assignee: BAE Systems Tactical Vehicle Systems LP, Sealy, TX (US)

( * ) Notice: Subject to any disclaimer, the term of this patent is extended or adjusted under 35 U.S.C. 154(b) by 0 days.

(21) Appl. No.: 11/149,668

(22) Filed: Jun. 10, 2005

(65) Prior Publication Data

US 2010/0011948 A1 Jan. 21, 2010

Related U.S. Application Data

(60) Provisional application No. 60/578,986, filed on Jun. 11, 2004, provisional application No. 60/621,506, filed on Oct. 22, 2004.

(51) Int. Cl.
*F41H 5/14* (2006.01)
(52) U.S. Cl. .................................. 89/36.09
(58) Field of Classification Search ............... 89/36.07, 89/36.08, 36.09, 36.11
See application file for complete search history.

(56) References Cited

U.S. PATENT DOCUMENTS

| | | | | |
|---|---|---|---|---|
| 1,913,554 | A * | 6/1933 | Luker | .......... 89/36.08 |
| 2,382,862 | A * | 8/1945 | Davis, Jr. | .......... 89/36.08 |
| 3,700,534 | A | 10/1972 | Cook | |
| 3,722,355 | A | 3/1973 | King | |
| 4,090,011 | A | 5/1978 | Barkman | |
| 4,132,446 | A | 1/1979 | Bauer | |
| 4,186,817 | A * | 2/1980 | Bauer | .......... 180/68.1 |
| 4,280,393 | A | 7/1981 | Giraud | |
| 4,326,445 | A * | 4/1982 | Bemiss | .......... 89/36.08 |
| 4,352,316 | A | 10/1982 | Medlin | |
| 4,404,889 | A | 9/1983 | Miguel | |
| 4,469,537 | A | 9/1984 | Ashton et al. | |
| 4,492,282 | A * | 1/1985 | Appelblatt et al. | .......... 180/68.1 |
| 4,529,640 | A | 7/1985 | Brown et al. | |
| 4,594,290 | A | 6/1986 | Fischer et al. | |
| 4,633,756 | A | 1/1987 | Rudoi | |
| 4,664,967 | A | 5/1987 | Tasdemiroglu | |
| 4,665,794 | A | 5/1987 | Gerber et al. | |
| 4,683,800 | A | 8/1987 | Snedeker | |

(Continued)

FOREIGN PATENT DOCUMENTS

DE 004005 904 A1 8/1991

(Continued)

OTHER PUBLICATIONS http://web.archive.org/web/20030405192534/http://www.globalsecurity.org/military/systems/ground/m1078.htm, retrieved Aug. 31, 2009.*

(Continued)

*Primary Examiner*—Troy Chambers
(74) *Attorney, Agent, or Firm*—Greenberg Traurig LLP; Ben D. Tobor

(57) ABSTRACT

An armored cab for a vehicle is provided, the cab including multiple layers of armoring material, and having a shape to assist in the deflection of radar and the various types of ordinance which may be fired or exploded against the armored cab.

9 Claims, 6 Drawing Sheets

U.S. PATENT DOCUMENTS

| | | | |
|---|---|---|---|
| 4,732,803 A | 3/1988 | Smith, Jr. |
| 4,739,690 A | 4/1988 | Moskowitz |
| 4,757,742 A | 7/1988 | Mazelsky |
| 4,836,084 A | 6/1989 | Vogelesang et al. |
| 4,842,923 A | 6/1989 | Hartman |
| 4,876,941 A | 10/1989 | Barnes et al. |
| 4,879,165 A | 11/1989 | Smith |
| 4,911,061 A | 3/1990 | Pivitt et al. |
| 4,945,814 A | 8/1990 | Huet |
| 4,953,442 A | 9/1990 | Bartuski |
| 4,969,386 A | 11/1990 | Sandstrom et al. |
| 4,979,425 A | 12/1990 | Sprague |
| 4,987,033 A | 1/1991 | Abkowitz et al. |
| 5,014,593 A | 5/1991 | Auyer et al. |
| 5,060,553 A | 10/1991 | Jones |
| 5,070,764 A | 12/1991 | Shevach et al. |
| 5,074,611 A | 12/1991 | Newkirk |
| 5,114,772 A | 5/1992 | Vives et al. |
| 5,221,807 A | 6/1993 | Vives |
| 5,271,311 A | 12/1993 | Madden, Jr. |
| 5,290,637 A | 3/1994 | Sliney |
| 5,326,606 A | 7/1994 | Labock |
| 5,340,633 A | 8/1994 | VanDer Loo et al. |
| 5,349,893 A | 9/1994 | Dunn |
| 5,361,678 A | 11/1994 | Roopchad et al. |
| 5,364,679 A | 11/1994 | Groves |
| 5,398,592 A | 3/1995 | Turner |
| H1434 H | 5/1995 | Cytron |
| 5,421,087 A | 6/1995 | Newkirk et al. |
| 5,435,226 A | 7/1995 | McQuilkin |
| 5,443,917 A | 8/1995 | Tarry |
| 5,452,641 A | 9/1995 | Kariya |
| 5,463,929 A | 11/1995 | Mejia |
| 5,469,773 A | 11/1995 | Tarpinian |
| 5,471,905 A | 12/1995 | Martin |
| 5,474,352 A | 12/1995 | Davies |
| 5,483,864 A | 1/1996 | Vanark et al. |
| H1519 H | 3/1996 | Semple |
| 5,506,051 A | 4/1996 | Levy-Borochov et al. |
| 5,517,894 A | 5/1996 | Bohne et al. |
| 5,531,500 A | 7/1996 | Podvin |
| 5,533,781 A | 7/1996 | Williams |
| H1567 H | 8/1996 | Parsons et al. |
| 5,560,971 A | 10/1996 | Emery |
| 5,591,933 A | 1/1997 | Li et al. |
| 5,594,193 A | 1/1997 | Sheridan |
| 5,635,288 A | 6/1997 | Park |
| 5,663,520 A | 9/1997 | Ladika |
| 5,668,344 A | 9/1997 | Bornstein |
| 5,670,734 A | 9/1997 | Middione et al. |
| 5,679,918 A | 10/1997 | Korpi et al. |
| 5,686,689 A | 11/1997 | Snedeker et al. |
| 5,705,164 A | 1/1998 | Mackey et al. |
| 5,705,765 A | 1/1998 | Singh et al. |
| 5,723,807 A | 3/1998 | Kuhn, II |
| 5,735,847 A | 4/1998 | Gough et al. |
| 5,738,925 A | 4/1998 | Chaput |
| 5,747,159 A | 5/1998 | Labock |
| 5,747,170 A | 5/1998 | Von Alpen et al. |
| 5,749,140 A | 5/1998 | Polito et al. |
| 5,763,813 A | 6/1998 | Cohen et al. |
| 5,767,435 A | 6/1998 | Reymann |
| 5,778,506 A | 7/1998 | Gonzalez |
| 5,792,974 A | 8/1998 | Daqis et al. |
| 5,803,212 A | 9/1998 | Reinehr et al. |
| 5,808,228 A | 9/1998 | Beschle et al. |
| 5,851,932 A | 12/1998 | Dickson |
| 5,857,730 A | 1/1999 | Korpi et al. |
| 5,866,839 A | 2/1999 | Ohayon |
| 5,880,394 A | 3/1999 | Kim |
| 5,905,225 A | 5/1999 | Joynt |
| 5,922,986 A | 7/1999 | Wanninger et al. |
| 5,970,843 A | 10/1999 | Strasser et al. |
| 5,972,819 A | 10/1999 | Cohen |
| 5,976,656 A | 11/1999 | Giraud |
| 6,021,703 A | 2/2000 | Geiss et al. |
| 6,027,158 A | 2/2000 | Yang |
| 6,082,240 A | 7/2000 | Middione et al. |
| 6,087,013 A | 7/2000 | Chilson |
| 6,112,635 A | 9/2000 | Cohen |
| 6,129,974 A | 10/2000 | Woll |
| 6,135,006 A | 10/2000 | Strasser et al. |
| 6,164,181 A | 12/2000 | Bruner |
| 6,174,398 B1 | 1/2001 | Dieterich et al. |
| 6,187,451 B1 | 2/2001 | Boos |
| 6,203,908 B1 | 3/2001 | Cohen |
| 6,216,579 B1 | 4/2001 | Boos |
| 6,289,781 B1 | 9/2001 | Cohen |
| 6,311,605 B1 | 11/2001 | Kellner |
| 6,314,858 B1 | 11/2001 | Strasser et al. |
| 6,327,954 B1 | 12/2001 | Medlin |
| 6,332,390 B1 | 12/2001 | Lyons |
| 6,334,382 B2 | 1/2002 | Gourio |
| 6,357,332 B1 | 3/2002 | Vecchio |
| 6,361,883 B1 | 3/2002 | Dilg et al. |
| 6,363,830 B1 | 4/2002 | Gonzalez |
| 6,405,630 B1 | 6/2002 | Gonzalez |
| 6,408,733 B1 | 6/2002 | Perciballi |
| 6,408,734 B1 | 6/2002 | Cohen |
| 6,435,071 B1 | 8/2002 | Campbell |
| 6,474,213 B1 | 11/2002 | Walker |
| 6,477,934 B1 | 11/2002 | Bruhn et al. |
| 6,481,782 B2 | 11/2002 | Bond |
| 6,497,966 B2 | 12/2002 | Cohen |
| 6,510,777 B2 | 1/2003 | Neal |
| 6,532,857 B1 | 3/2003 | Shih et al. |
| 6,537,654 B1 | 3/2003 | Gruber et al. |
| 6,544,913 B2 | 4/2003 | Kim et al. |
| 6,568,310 B2 | 5/2003 | Morgan |
| 6,571,677 B1 | 6/2003 | Kaura |
| 6,575,075 B2 | 6/2003 | Cohen |
| 6,581,504 B2 | 6/2003 | Caron |
| 6,601,497 B2 | 8/2003 | Rhiorse et al. |
| 6,612,217 B1 | 9/2003 | Shockey |
| 6,622,608 B1 | 9/2003 | Faul et al. |
| 6,635,357 B2 | 10/2003 | Moxson et al. |
| 6,647,856 B1 | 11/2003 | Neal |
| 6,647,857 B1 | 11/2003 | Newkirk |
| 6,658,984 B2 | 12/2003 | Zonak |
| 6,679,157 B2 | 1/2004 | Chu et al. |
| 6,698,331 B1 | 3/2004 | Yu et al. |
| 6,703,104 B1 * | 3/2004 | Neal .......................... 428/118 |
| 6,708,595 B1 | 3/2004 | Chaussade et al. |
| 6,737,158 B1 | 5/2004 | Thompson |
| 6,745,662 B2 | 6/2004 | Ford |
| 6,779,431 B2 * | 8/2004 | Honlinger .................. 89/36.08 |
| 6,923,107 B2 * | 8/2005 | Zurek et al. ................ 89/36.08 |
| 7,393,045 B1 * | 7/2008 | Gonzalez ............... 296/190.04 |
| 2001/0032540 A1 | 10/2001 | Gourio |
| 2001/0032541 A1 | 10/2001 | Benyami et al. |
| 2002/0012768 A1 | 1/2002 | Cohen |
| 2002/0092415 A1 | 7/2002 | Caron |
| 2002/0104429 A1 | 8/2002 | Euler |
| 2002/0145308 A1 | 10/2002 | Honlinger |
| 2002/0178900 A1 | 12/2002 | Ghiorse et al. |
| 2003/0010189 A1 | 1/2003 | Zonak |
| 2003/0024378 A1 | 2/2003 | Ford |
| 2003/0051598 A1 | 3/2003 | Mauthe et al. |
| 2003/0110931 A1 | 6/2003 | Aghajanian et al. |
| 2003/0110932 A1 | 6/2003 | Mohr et al. |
| 2003/0150321 A1 | 8/2003 | Lucuta et al. |
| 2003/0159575 A1 | 8/2003 | Reichman |
| 2003/0167910 A1 | 9/2003 | Strait |
| 2003/0192426 A1 | 10/2003 | Peretz |

| | | | |
|---|---|---|---|
| 2003/0200861 | A1 | 10/2003 | Cordova et al. |
| 2003/0217638 | A1 | 11/2003 | Fleming |
| 2003/0221547 | A1 | 12/2003 | Peretz |
| 2004/0020353 | A1 | 2/2004 | Ravid et al. |
| 2004/0020354 | A1 | 2/2004 | Ravid et al. |
| 2004/0083879 | A1 | 5/2004 | Benyami et al. |
| 2004/0083880 | A1 | 5/2004 | Cohen |
| 2004/0084304 | A1 | 5/2004 | Thompson |
| 2004/0089143 | A1 | 5/2004 | Gilon |
| 2004/0094026 | A1 | 5/2004 | Efim et al. |
| 2005/0257679 | A1* | 11/2005 | Hass et al. .................. 89/36.09 |

FOREIGN PATENT DOCUMENTS

| | | |
|---|---|---|
| DE | 004215 434 A1 | 11/1993 |
| DE | 004236 234 A1 | 4/1994 |
| EP | A1 209221 | 5/1986 |
| EP | A1 287918 | 4/1988 |
| EP | A1 533289 | 9/1992 |
| EP | A1 572965 | 6/1993 |
| EP | A1 620411 | 4/1994 |
| EP | 0 599 386 A | 6/1994 |
| EP | A1 636849 | 7/1994 |
| GB | 2 099 063 A | 12/1982 |
| GB | 2231129 A | 1/1989 |
| GB | 2260600 A | 4/1993 |
| GB | 2276933 A | 4/1993 |
| GB | 2276934 A | 4/1993 |
| GB | 2276935 A | 4/1993 |
| GB | 2277141 A | 4/1993 |
| GB | 2272272 A | 5/1994 |
| WO | WO 91/00490 | 1/1991 |
| WO | WO 91/07633 | 5/1991 |
| WO | WO 91/12483 | 8/1991 |
| WO | WO 93/19342 | 9/1993 |
| WO | WO 94/01732 | 1/1994 |
| WO | WO 94/19660 | 9/1994 |
| WO | WO 94/23263 | 10/1994 |
| WO | WO 94/27110 | 11/1994 |
| WO | WO 2004/053421 | 6/2004 |

OTHER PUBLICATIONS

T.F. Jacobsen, "Transparent Armor Options Ground Vehicles", Sierracin/Sylmar Corp., TransTech Products, Sylmar, CA 91342.

International Armoring Corporation, Ogden, Utah, www.armormax.com/Specifications.htm.

Army Public Affairs, ARNEWS, Army News Service, www4.army.mil.ocpa/read.php?story_id_key=965, Jun. 11, 2004.

"Arotech Armoring Subsidiary MDT Awarded over $850,000 New Contracts", Oct. 28, 2003, www.arotech.com/pr/2003/pr28102003.shtml.

"Armor Materials", Ceradyne, Inc., www.ceradyne.com/products/armor_materials.asp.

"Spectra: Making a Difference in Vehicle Armor", www.firstdefense.com/html/default_vehicle_armor.htm.

"Cost Effective, Advanced Ceramic Armor", Last Armor, Foster-Miller, Inc., Waltham, MA, Sep. 4, 1992.

"DuPont Kevlar® Drives New Armor Protection System for Passenger Vehicles", DuPont Advanced Fibers Systems, Richmond, VA.

"Army: Vehicle Armor Upgrade by Summer", Mar. 25, 2004, www.foxnews.com/story/0,2933,115265,00.html.

"Gallery of Vehicles", Texas Armoring Corporation, www.texasarmoring.com/armoredvehicles.htm.

"Seabee Ingenuity Creates New OIF Vehicle Armor", Navy Newsstand, May 4, 2004, www.news.navy.mil/search/display.asp?story_id=13003.

"Seabee Ingenuity Creates New OIF Vehicle Armor", Navy Newsstand, May 4, 2004, www.globalsecurity.org/military/library/news/2004/05/mil-040504nns01.htm.

"Vehicle Armor and Ballistic and Blast Protection", Spy Tech Agency, West Hollywood, CA, http://store.yahoo.com/spytechagency/veharandbalp.html.

Stewart & Stevenson Press Release, "Stewart & Stevenson's New FMTV Armored Cab Provides Exceptional Crew Protection," Paris, France, Jun. 15, 2004.

International Search Report for PCT/US2005/020597.

* cited by examiner

ARMORED CAB FOR VEHICLES

RELATED APPLICATION

This application claims the benefit of U.S. Provisional Patent Application Ser. Nos. 60/578,986, filed Jun. 11, 2004, and 60/621,506, filed Oct. 22, 2004, each entitled Armored Cab for Vehicles.

BACKGROUND OF THE INVENTION

1. Field of the Invention

Various types of vehicles, such as tactical vehicles, or tactical trucks, and similar vehicles used in a battlefield or other armed conflict situations may sustain small arms fire, rocket explosions, artillery airbursts, land mine strikes, or attacks from improvised explosive devices. It would be desirable for these vehicles to be able to withstand the forces of the foregoing types of attacks and explosions to enhance the survivability for the occupants of such vehicles. By armoring the cab, or passenger cabin, of a vehicle, the survivability for the occupants of the vehicle may be enhanced.

2. Description of the Related Art

Present vehicles, such as tactical vehicles, or tactical trucks, and similar vehicles used on the battlefield or other armed conflict situations, have not typically been armored to withstand the forces of small arms fire, rocket explosions, artillery air bursts, land mine strikes, or attacks from improvised explosive devices. If such present vehicles have been provided with some type of armoring, such armoring may not have been as successful as desired in withstanding the forces of the foregoing types of attacks and explosions, whereby a desired level of occupant, or soldier, survivability has been achieved. In general, the armoring of the foregoing types of vehicles has been achieved by mounting a layer of armor plate material upon the existing walls of the cab, or passenger cabin. As to vehicles presently located in a combat zone, it is many times difficult to armor such vehicles in a combat zone, as well as the vehicle may not have been initially designed to permit the addition of armoring material, or the additional weight of the armoring material detracts from the performance of the vehicle. Additionally, there has not been much flexibility in providing varying degrees of armoring, or levels of protection.

Other disadvantages associated with present tactical vehicles and tactical trucks is that they are not designed to have a shape that provides stealth characteristics against radar, nor a shape which assists in the deflection of the various types of ordinance which may be fired or exploded against such vehicles.

Accordingly, prior to the development of the present invention, there has been no cab for use with vehicles, such as tactical vehicles, or tactical trucks, which: may be easily and readily armored; is able to afford various degrees of protection against the forces of the ordinance which may be fired or exploded against the cab of the vehicle; affords stealth characteristics against radar; and which has a shape which assists in the deflection of the various types of ordinance which may be fired or exploded against the armored cab. Therefore, it would be advantageous if an armored cab for tactical vehicles could be provided which has the advantages of: having a shape which provides stealth characteristics against radar; a shape which assists in the deflection of the various types of ordinance which may be fired or exploded against the armored cab; and which provides an enhanced level of soldier survivability for the occupants/soldiers occupying the armored cab.

SUMMARY OF THE INVENTION

In accordance with the present invention, the foregoing advantages have been achieved through the present armored cab for use with a tactical vehicle and related methods. The present invention includes: an armored cab for a vehicle wherein the walls of the vehicle are initially made from an armor plate material; an armoring construction for a cab for a vehicle which includes a first layer of a first armor plate material, a second layer of a plastic material, and a third layer of a second armor plate material; a method for armoring a cab by associating three layers of material with at least some of the walls of the cab; and a method for constructing a cab for a vehicle, wherein some of the walls of the vehicle have upper and lower outer wall surfaces which are angled.

Figure 1:
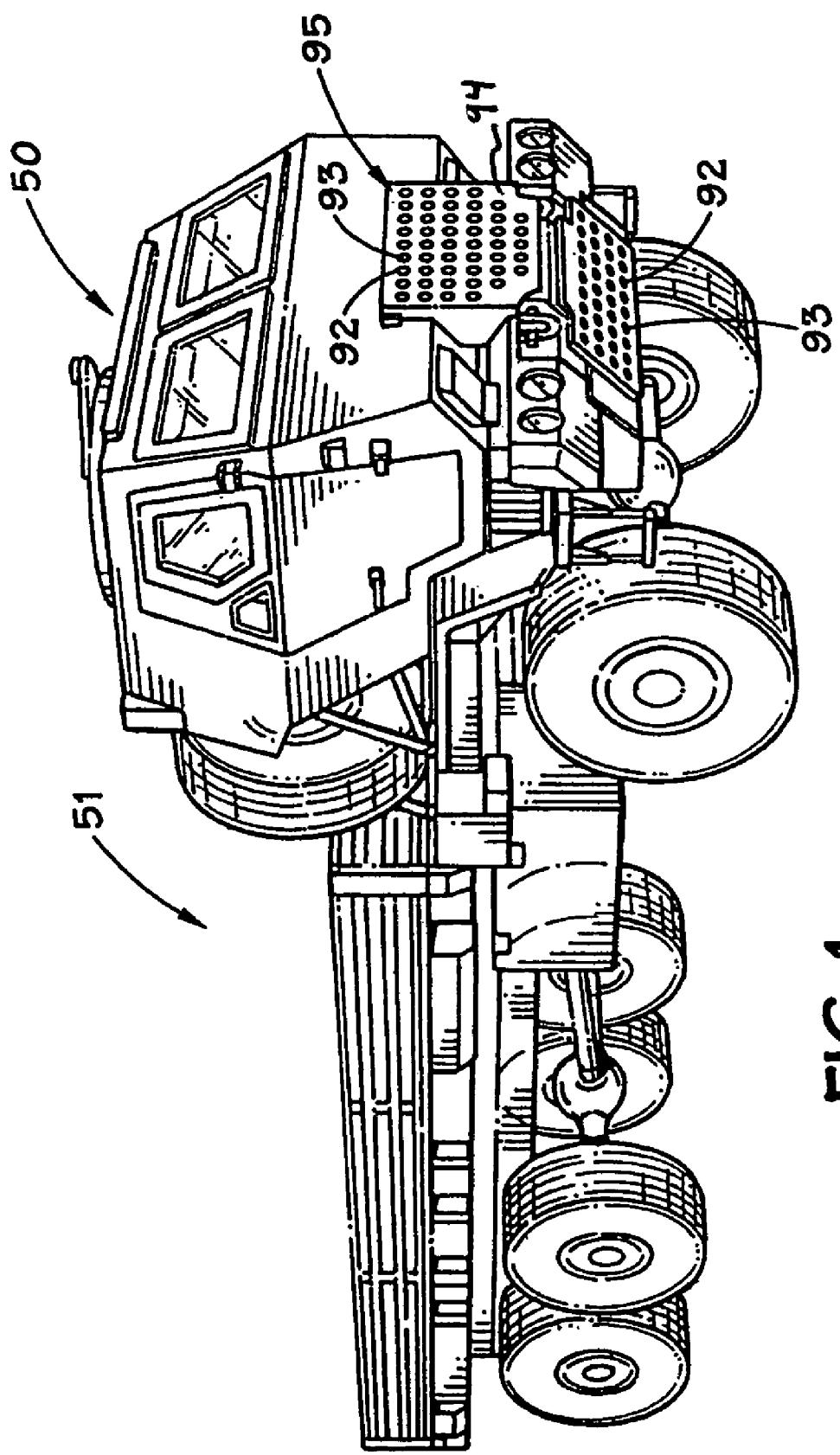
FIG. 1 is a perspective view of a tactical vehicle or truck.

While the invention will be described in connection with the preferred embodiments, it will be understood that it is not intended to limit the invention to those embodiments. On the contrary, it is intended to cover all alternatives, modifications, and equivalents, as may be included within the spirit and scope of the invention as defined by the appended claims.

DETAILED DESCRIPTION OF THE INVENTION AND SPECIFIC EMBODIMENTS

With reference to FIGS. 1-6, an armored cab 50 for a tactical vehicle, or truck 51, is shown. The armored cab 50 generally includes: at least one upper wall, or upper wall surface, 52; side walls, or side wall surfaces, 53; front wall, or front wall surfaces, 54; back wall, or back wall surfaces, 55; and floor, or bottom wall, or bottom wall surfaces, 56. The upper wall or top 52 may be provided with an opening 57 for a gun turret 80. At least one, and preferably two, doors 58 may be provided in the side walls 53. Each door 58 may be provided with a window 59, and the front wall surfaces 54 may be provided with at least one, and preferably two, windows 60. Preferably, all the windows 59, 60 are made from any suitable bullet-proof material which is transparent and affords the desired visibility for the occupants (not shown) of the armored cab 50, while at the same time affording protection against the explosive forces and small arms fire, previously described.

Still with reference to FIGS. 1-6, the armored cab 50 is manufactured from materials having the requisite strength characteristics to withstand the explosive forces and small arms fire previously described. At least some, and preferably all, of the walls 52-56 of armored cab 50, and door or doors 60 are made from an armor plate material, preferably that known as high hard steel, or armor steel, or other similar material having the requisite strength characteristics to withstand the forces encountered in a battlefield or other type of conflict situation. Preferably, the thickness of the armor steel, or high hard steel, is approximately 3 to 10 millimeters thick, and preferably 6 millimeters thick. Preferably, to provide protection to the occupants of armored cab 50 against land mine strikes, or similar explosions from beneath armored cab 50, the floor, or bottom wall surfaces 56 of armored cab 50 may have a thickness in excess of the thickness of the other wall surfaces of armored cab 50. For example, the floor panels, or floor surfaces, 56 may be a double thickness of high hard steel. The floor 56 may be comprised of two layers of high hard steel, one layer abutting the other layer of high hard steel or alternatively, one layer of armor steel could be disposed in a spaced relationship from the other layer of armor steel, or armor plate. Some, and preferably all, of the interior wall surfaces 75 (FIGS. 7 and 8) of armored cab 50 are provided with a layer 76 of a plastic or synthetic fiber material, such as a sheet, layer, or panel of an aramid material which provides protection against ballistic and explosive forces. One example of such an aramid material which may be used is KEVLAR® sold by E.I. du Pont de Nemours and Company. Preferably, layers 76 of an aramid material or other suitable plastic or synthetic material having the requisite strength and ballistic and explosion protection characteristics, are layered over the interior 75 of all of the wall surfaces of the armored cab 50 with the exception of windows 59, 60. The thickness of the aramid layer material may be approximately from ¼ inch to 2 inches in thickness, and preferably is ¾ inch in thickness. The thickness of the aramid material is selected dependent upon the anticipated threat, or force of the small arms fire and/or explosive forces to be encountered. The aramid panels in the interior of the armored cab 50, if desired, do not have to be placed on interior floor surfaces, if the thickness of the armor plate for the floor surfaces 56 have been increased, as previously described.

Figure 3:
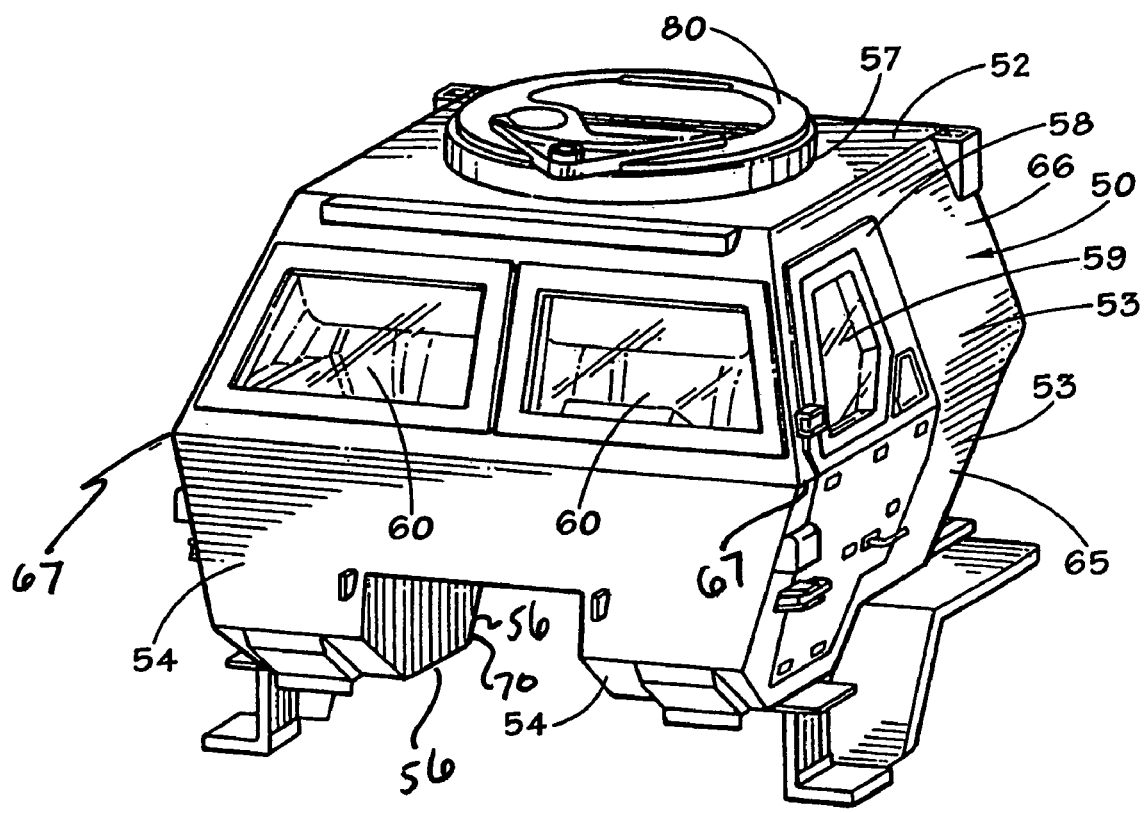
FIG. 3 is a perspective, front view of an armored cab for use with the tactical vehicle of FIG. 1, in accordance with the present invention.
Figure 4:
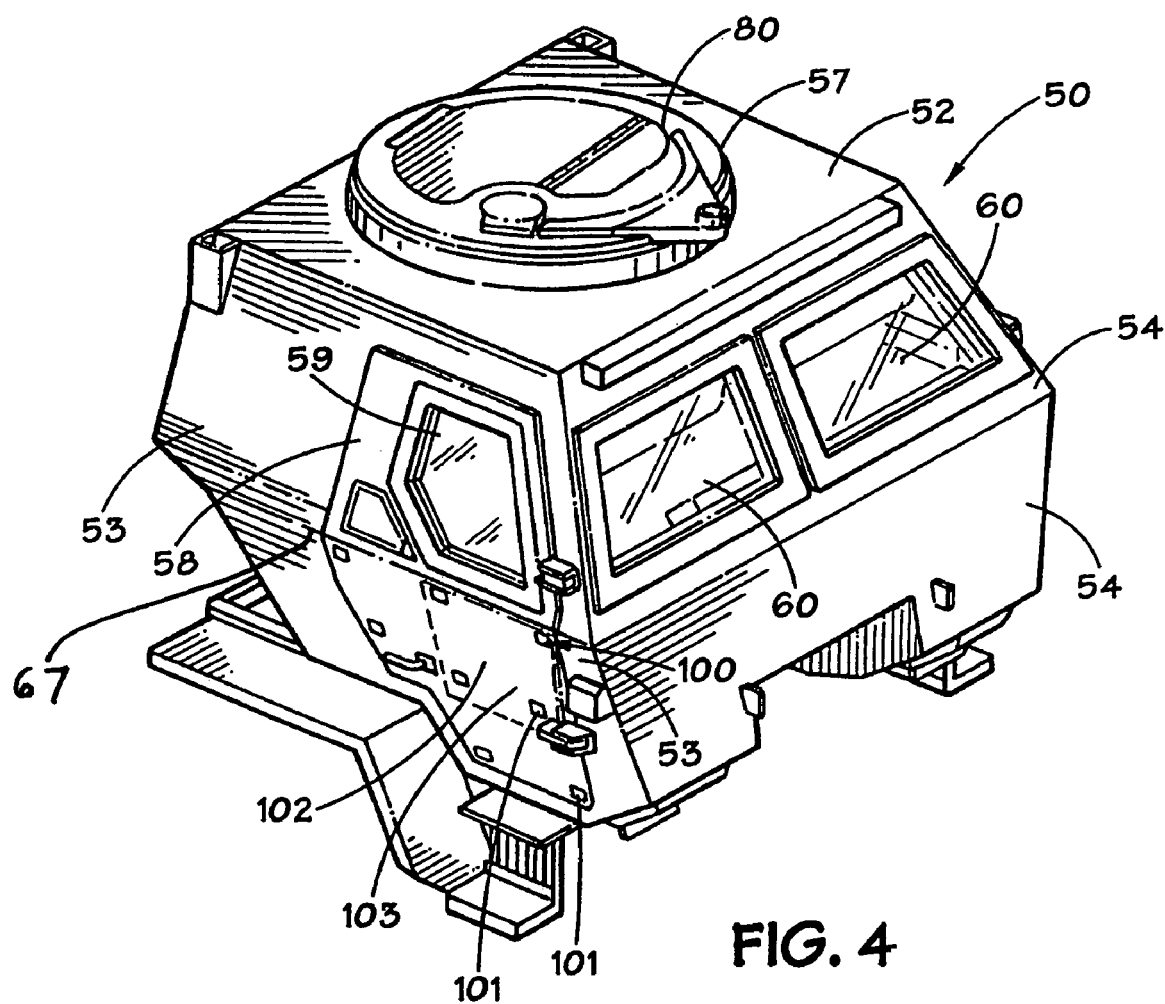
FIG. 4 is a perspective, side view of the armored cab of FIG. 3.

With reference to FIGS. 3 and 4 it should be noted that the upper wall 52 of the armored cab 50 may be provided with a cover (not shown) to cover the opening 57 for the gun turret 80. Preferably the cover (not shown) is a bolt on cover made of the same armor plate material as the rest of the armored cab 50.

With references to FIGS. 3-6, it is seen that at least some of the walls 53-55, and preferably each of the side, front, and back walls 53-55 are formed with angled lower and upper wall surfaces 65, 66. Lower wall surfaces 65 slope, or are angled, downwardly and inwardly from their upper ends which join the lower ends of the upper wall surfaces 66 at junctures 67; and the upper wall surfaces 66 slope, or are angled, upwardly and inwardly from their lower ends which join the upper ends of the lower wall surfaces 65 at junctures 67. Lower and upper wall surfaces provide a shape to the armored cab 50 that provides stealth characteristics against radar, as well as assists in the deflection of the various types of ordnance which may be fired or exploded against armored cab 50.

Figure 5:
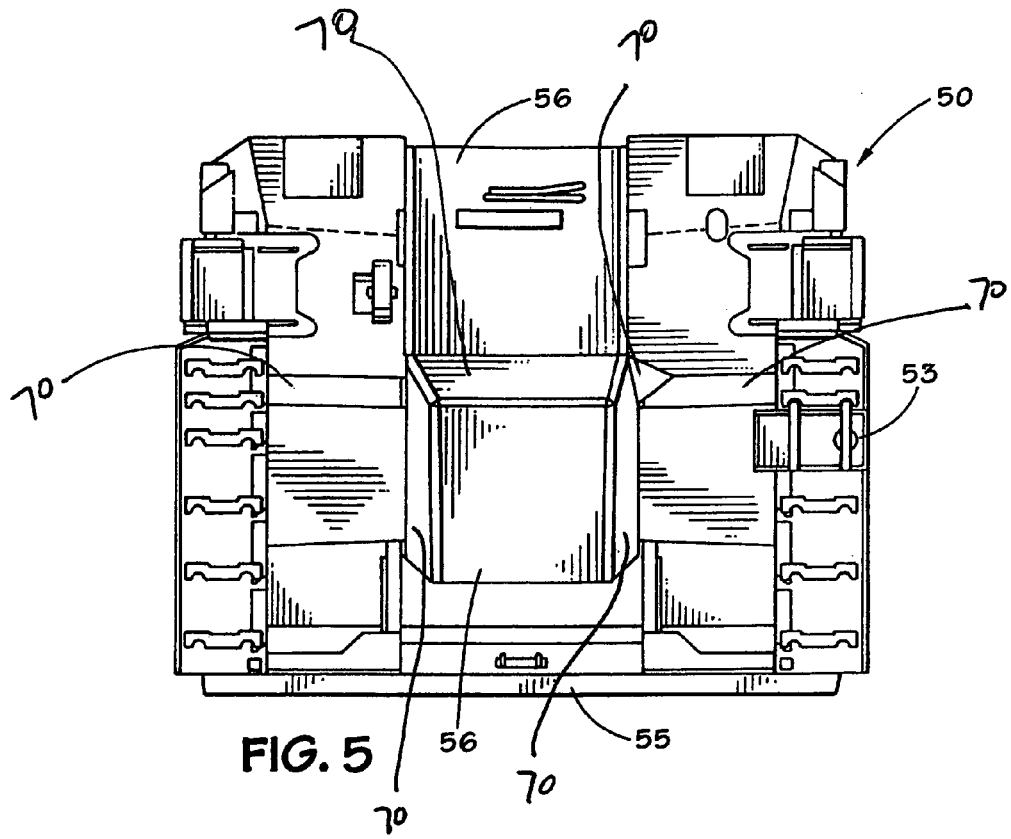
FIG. 5 is a bottom view of the armored cab of FIGS. 3 and 4.
Figure 6:
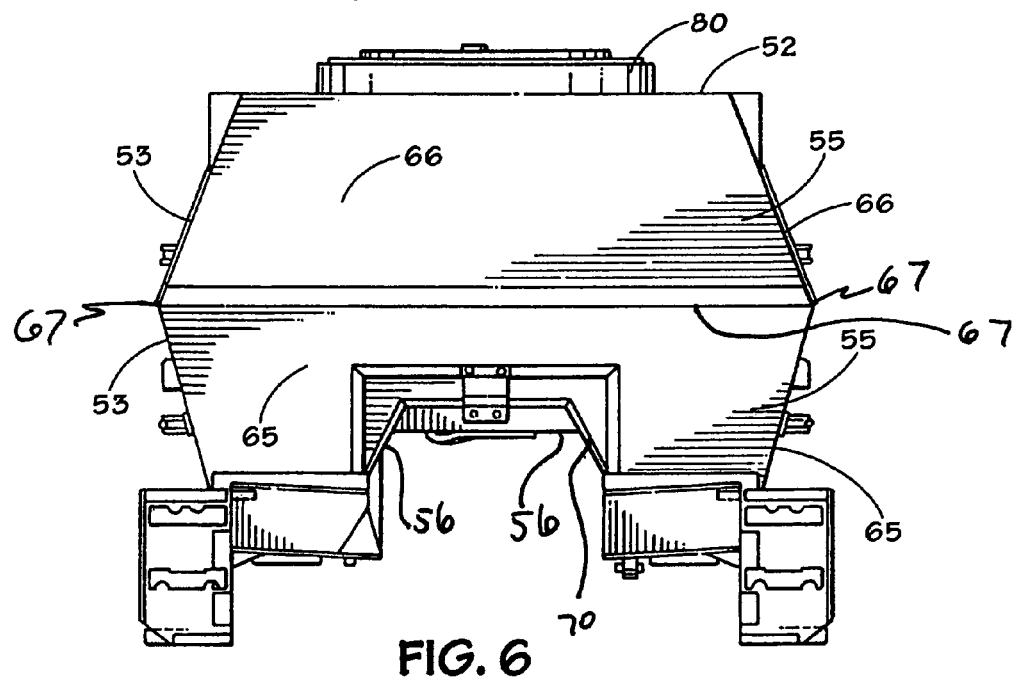
FIG. 6 is a rear view of the armored cab of FIGS. 3-5.

With reference to FIGS. 3, 5, and 6, it is seen that the lower, or bottom, wall 56, include a plurality of angled, or sloping, wall surfaces 70 which provide a shape to the floor 56 of armored cab 50 that may provide stealth characteristics against radar, as well as assist in the deflection of the various types of ordnance which may be fired or exploded against the floor 56 of armored cab 50. As seen in FIG. 5, the use of the plurality of angled, or sloping, floor wall surfaces 70, provides the floor 56 of armored cab with a generally faceted construction, or configuration, wherein the floor 56 is comprised of a plurality of small planar surfaces, or wall surfaces 70 and 56, rather than a single planar bottom which would likely not assist very well in the deflection of the various types of ordinance which may be fired or exploded against armored cab 50.

Armored cab 50 may be assembled at the plant which initially manufactures the vehicle 51, installed upon, or attached to, vehicle 51, and then sent out to a battlefield location. Alternatively, armored cab 50 may be manufactured as an integrated unit, which may be shipped to a battlefield location to be used as a replacement for an existing unarmored cab (not shown). Preferably, the old, unarmored cab may be removed, such as by unbolting the old cab, and then replacing the old cab with the armored cab 50 of the present application, which is then secured to the truck, or vehicle, 51.

Figure 7:
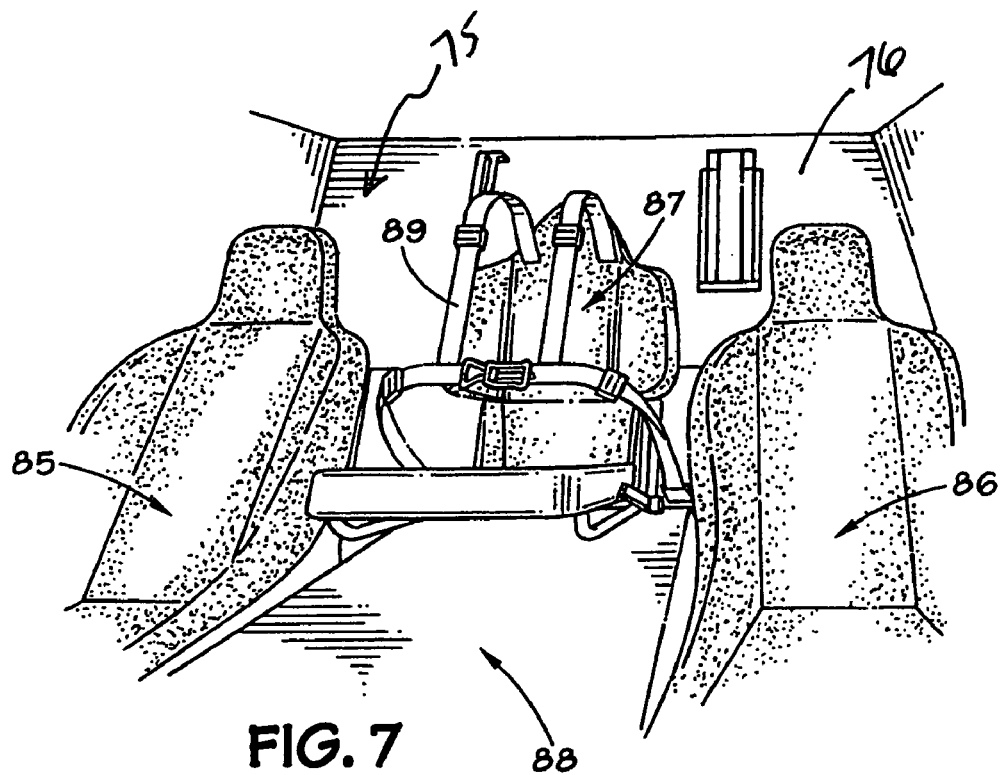
FIG. 7 is a perspective view of a portion of the interior of the armored cab of FIGS. 3-6.
Figure 8:
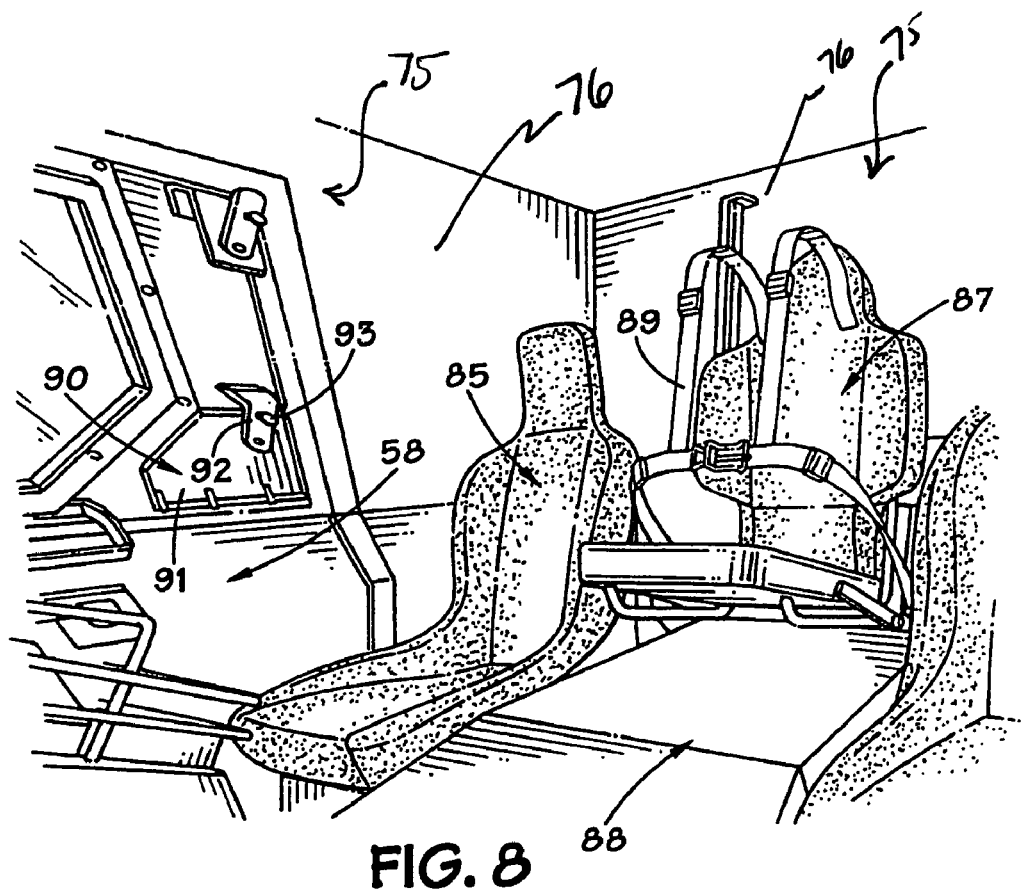
FIG. 8 is another perspective view of a portion of the interior of the armored cab of FIGS. 3-6.

Armored cab 50, if desired, may be provided with an air conditioning unit, as well as a chemical air filtration unit (not shown), to provide a cool environment within cab 50, as well as to provide for safe air to breathe within the cab 50. Armored cab 50 may provide for two or three occupants to travel within cab 50, the armored cab of FIGS. 1-8 being illustrated as a three-person cab. As shown in FIGS. 7 and 8, two seats 85, 86 are disposed within the interior of armored cab 50 in a conventional location within armored cab 50. A third seat 87 may be provided and disposed upon the transmission tunnel 88 of cab 50. Each of the seats 85-87 may be provided, if desired, with a safety harness 89 as illustrated in connection with seat 87. If desired, doors 58 may be provided with a weapons, or gun, port 90 which may be comprised of a hinged door 91 which may be secured in a closed position by the engagement of a rotatable locking member 92 which engages with a locking pin 93. It should be understood that any suitable mechanism may be used to secure door 91 in a closed position, and in turn permit the gun port 90 to be easily opened when it is desired to fire a weapon from the interior of the armored cab 50.

Figure 2:
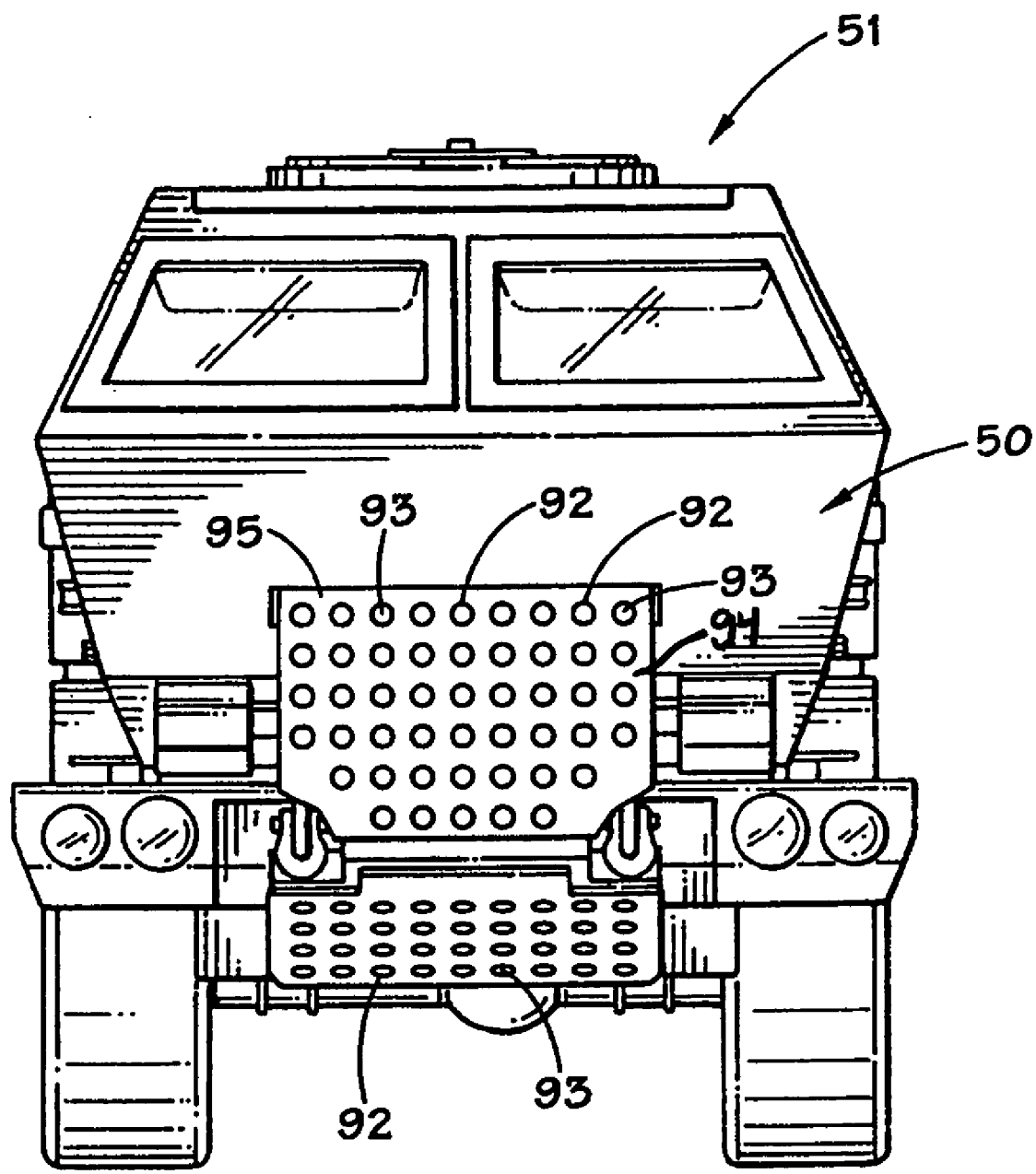
FIG. 2 is a front view of the tactical vehicle of FIG. 1.

As shown in FIGS. 1 and 2, the tactical vehicle 51 may be also be provided with an armored shroud 95 which affords protection to the radiator (not shown) of tactical vehicle 51. The armored shroud 95 may be made of any suitable material having the requisite strength characteristics to withstand explosive forces and small arms fire, such as those previously described. The armored shroud 95 is constructed so that air may pass through openings 92 and flow toward the radiator (not shown). However, the openings 92 are blocked by a plate, or plates, of armor plate material 93 which are disposed in a spaced relationship from the front wall surface 94 of the armored shroud, so as to prevent a straight-line passage through the armored shroud 95 toward the radiator. The desired air can flow through the openings 92 and around plate 93; however, a bullet or other ordinance, upon passing through openings 92 would be deflected by plate or plates 93.

With reference to FIG. 4, if desired, doors 58 may be provided with a supplemental armor connector 100, which may take the form of one or more mounting lugs 101, disposed upon the exterior surface of door 58. Supplemental armor connector 100 maybe used to secure supplemental armor 102, shown in dotted lines, which may be secured to the outer surface of door 58. Supplemental armor 102 may be a plate(s), or panel(s), 103 of a material having the requisite strength characteristics to withstand the explosive forces and small arms fire previously described. Panels, or plates, 103 may be made from an armor plate material, such as the high hard steel, or armor steel, as previously described, or a panel, or panels, 103 of an aramid type material may be used. Alternatively, and preferably, the plate or plates 103 may be formed of aluminum, and the aluminum plate or plates 103 serve to absorb some of the explosive forces and small arms fire previously described. The mounting lugs 101 may fit within openings formed within supplemental armor 102, and mounting pins (not shown) may be used to secure the plates 103 to the exterior surface of door 58. Alternatively, any other suitable connector could be utilized to either fixedly secure, or removably secure plates 103 to door 58. If desired, the supplemental armor 102 could be provided upon not only doors 58, but also upon the other wall surfaces 52-56 of armored cab 50. By providing multiple layers of different materials, such as aluminum panels, aramid panels, and the armored steel wall surfaces 52-56 of armored cab 50, the desired protection against expected explosive forces and small arms fire previously described may be provided to the occupants of armored cab 50.

The present invention has been described and illustrated with respect to a specific embodiment. It will be understood to those skilled in the art that change and modifications may be made without departing from the spirit and scope of the invention as set forth in the appended claims.

We claim:

1. An armored cab for a tactical truck having a front axle and at least one rear axle, each axle having at least two wheels mounted thereon, comprising:
    an upper wall;
    two side walls, with a door in each side wall;
    a front wall;
    a back wall;
    a bottom wall;
    all the walls being made from an armor plate material of high hard steel, wherein the upper, side, front, and back walls have a first thickness of approximately 3-10 millimeters and the bottom wall has a second thickness of approximately 6-10 millimeters;
    the side walls, front wall, and back wall each have angled lower and upper wall surfaces, with the angled lower wall surfaces sloping downwardly and inwardly and the angled upper wall surfaces slope upwardly and inwardly;
    the bottom wall including a plurality of angled small wall surfaces, having varying angular dispositions with respect to adjacent angled small wall surfaces, and different shapes and sizes from adjacent angled small wall surfaces, which provide a generally faceted construction for the bottom wall;
    an armored shroud for a radiator, associated with the front wall;
    the walls defining an enclosed interior, having at least two seats and no more than three seats, within the interior, the seats being generally disposed above the front axle, with some of the plurality of angled small wall surfaces disposed beneath some of the seats in the enclosed interior; and
    the front, side and back walls being disposed above and substantially adjacent the front axle and the two wheels on the front axle, whereby substantially none of the enclosed interior is above or adjacent the at least one rear axle.

2. The armored cab of claim 1 wherein each of the walls has an interior wall surface, and at least some of the interior wall surfaces are provided with a layer of plastic material which provides protection against ballistic or explosive forces.

3. The armored cab of claim 2, wherein the plastic material is an aramid material.

4. The armored cab of claim 3, wherein layer of the plastic material has a thickness of approximately ¼ inch-2 inches.

5. The armored cab of claim 1, wherein each of the walls has an outer wall surface, and at least some of the outer wall surfaces are provided with supplemental armor.

6. The armored cab of claim 5, wherein the supplemental armor is comprised of panels disposed upon at least some of the outer wall surfaces.

7. The armored cab of claim 6, wherein the panels are made of high hard steel.

8. The armored cab of claim 6, wherein the panels are made of an aramid material.

9. The armored cab of claim 6, wherein the panels are made of aluminum.

* * * * *